United States Patent [19]

Sugiyama et al.

[11] Patent Number: 5,462,686
[45] Date of Patent: Oct. 31, 1995

[54] METHOD OF MANUFACTURING COMPOSITE FERRITE

[75] Inventors: Shunichi Sugiyama; Hiroshi Kametani, both of Yokohama; Hideyuki Yoshikoshi, Hino; Nobuaki Ikeda; Tomihiro Hara, both of Yokohama, all of Japan

[73] Assignees: NKK Corporation; Kokan Mining Co., Ltd.; Irox-NKK Co., Ltd., all of Tokyo, Japan

[21] Appl. No.: 283,207

[22] Filed: Jul. 29, 1994

Related U.S. Application Data

[63] Continuation of Ser. No. 32,965, Mar. 18, 1993, abandoned.

[30] Foreign Application Priority Data

Mar. 23, 1992 [JP] Japan ................................. 4-065143
Feb. 19, 1993 [JP] Japan ................................. 5-030759

[51] Int. Cl.$^6$ ............................ C04B 35/30; C04B 35/34
[52] U.S. Cl. ........................................ 252/62.62; 423/594
[58] Field of Search ........................... 252/62.62; 423/594

[56] References Cited

U.S. PATENT DOCUMENTS

| | | | |
|---|---|---|---|
| 3,189,550 | 6/1965 | Malinofsky | 252/62.62 |
| 3,378,335 | 4/1968 | Ellis et al. | 423/594 |
| 3,658,468 | 4/1972 | Cowlard et al. | 252/62.62 |
| 4,226,843 | 10/1980 | Watanabe et al. | 252/62.62 |

FOREIGN PATENT DOCUMENTS

| | | | |
|---|---|---|---|
| 30-40921 | 2/1991 | Japan . | |
| 3-40921 | 2/1991 | Japan | 252/62.62 |

OTHER PUBLICATIONS

Derwent Publications Ltd., London, G.B., AN 91–097658 & JP-A-3040921 (Nisshin Steel KK & Tokin Corp.) Abstract Feb. 21, 1991.

Derwent Publications Ltd., London, G.B., AN 92–280669 & JP-A-4192309 (Nisshin Steel Co., Ltd. & Tokin Corp.) Jul. 10, 1992.

Derwent Publications Ltd., London, G.B., AN 81–02859D & JP-A-55144421 (TDK Electronics KK) Abstract Nov. 12, 1980.

Derwent Publications Ltd., London, G.B., AN 72–24209T & JP-A-47011550 (TDK Electronics Co., Ltd.) Abstract Mar. 22, 1967.

*Primary Examiner*—C. Melissa Bonner
*Attorney, Agent, or Firm*—Frishauf, Holtz, Goodman, Langer & Chick

[57] ABSTRACT

Methods of manufacturing a composite ferrite of two or more of metal oxides prepared from a chloride solution containing ions of these metals, one of the metals being zinc. The methods comprise (a) ejecting a high temperature gas to the solution or atomizing the solution and (b) supplying the atomized gas to a combustion gas containing oxygen, to evaporate moisture from mist particles of the solution in a short period of time so that the zinc chloride in the solution is not substantially evaporated and to induce a heat decomposition or chemical reaction for the remaining metal salt particles, thereby forming a composite ferrite.

14 Claims, 3 Drawing Sheets

METHOD OF MANUFACTURING COMPOSITE FERRITE

This application is a Continuation of application Ser. No. 08/032,965, filed Mar. 18, 1993, now abandoned.

BACKGROUND OF THE INVENTION

1. Field of the Invention

The present invention relates to a method of manufacturing a composite ferrite used as a raw material for, for example, a magnetic member.

2. Description of the Related Art

Conventionally, the most popular method of synthesizing a composite oxide is the dry method in which a number of oxide powder materials are mixed with each other, and sintered at a high temperature to produce a composite oxide. The manufacturing procedure of this method includes the following steps.

Material→Mixture→Drying→Calcination→ Grinding→Product

However, the dry method entails some problems such as (1) that it is difficult to mix the powder materials uniformly with each other, (2) that impurities are likely to be mixed into the materials while grinding, and (3) that it takes a long time to synthesize a composite oxide due to solid-phase diffusion between oxide particles.

As mentioned, it is difficult to obtain a uniform composite material and therefore the characteristics of the product made from such a material are unsatisfactory. Further, the productivity is extremely poor. It should be noted that if calcination, grinding, and mixing are repeated to make the material uniform, the productivity is further degraded due to such repetition.

In the meantime, there is a coprecipitation method used for producing a uniform composite oxide in which a composite oxide material is dissolved into a solution with a nitrate of the metal constituting the oxide material, and some alkali is added thereto so as to precipitate the uniform composite oxide by coprecipitation. The procedure of this method takes the following steps.

Material→Dissolution→Strong Alkali→ Deposit Precipitation→Oxidation in Atmosphere→ Filtration→Drying→Product A composite oxide produced by this method, in fact, exhibits a uniform composition; however the method requires some time-consuming steps such as filtration, washing and drying, and is a complicated process as a whole. Thus, the cost of the composite oxide produced by this method is extremely high.

Besides the above dry and coprecipitation methods, there is a spray roasting method for synthesizing a composite oxide, mainly, composite ferrite. The procedure of this method takes the following steps.

Material→Dissolution→Spraying Heat Decomposition→Grinding→Product

In this method, the metal components of a ferrite is dissolved to make a chloride mixture solution, and the solution is sprayed and roasted in a combustion flame so as to synthesize a composite ferrite (Published Examined Japanese Patent Application (PEJPA) No. 47-11550).

The advantage of this method is that HCl, a byproduct, can be recycled for producing a metal chloride, thereby reducing the production cost. However, in the case where the method is applied to a solution containing metal chlorides having different vapor pressures, the metal chloride having the higher vapor pressure is volatilized out when atomizing, and dispersed in the form of chloride gas; therefore it is difficult to collect the oxide of the metal of the chloride having the higher vapor pressure (Published Unexamined Japanese Patent Application (PUJPA) No. 55-144421).

As a result, in order to manufacture a composite ferrite from metal chlorides containing chloride having high vapor pressure, it is necessary to perform mixing and roasting by the above dry method after the metal chloride having the high vapor pressure is transformed into oxides or carbonates.

In contrast thereto, there is proposed a method of atomizing a number of chloride solutions in the same direction as that of the flow of a high-temperature gas (Published Unexamined Japanese Patent Application Nos. 3-40921, and 4-192309). However, for large particles of solution mist, even when it is carried out in a roasting furnace by a combustion gas generated from an ordinary burner, roasting of the large particles do not proceed quickly, leaving some remaining chloride solution adhered to the furnace wall. When moderate roasting proceeds on the furnace wall, metal chlorides having high vapor pressure, for example, $ZnCl_2$, of the remaining chlorides adhered, are selectively roasted. Then, ZnO created by the selective roasting is collected by the gas flow, increasing the concentration of ZnO in the collected material. As a result, a composite ferrite is produced which has a composition ratio significantly different from the composition concentration ratio of the solution.

SUMMARY OF THE INVENTION

The present invention has been proposed in consideration of the above-described situation, and the object thereof is to provide a method of manufacturing, by use of the spray roasting technique, a composite ferrite having substantially the same composition ratio as that of the original solution.

According to the present invention, there is provided a method of manufacturing a composite ferrite of two or more types of metal oxides prepared from a solution containing those types of metal ions, comprising the steps of atomizing the solution, applying heat energy to the atomized solution so as to instantaneously evaporate the moisture component of each mist particle and to induce heat decomposition or chemical reaction of remaining metal salt particles, whereby to prepare composite ferrite grains.

The term, composite ferrite, used in connection with the present invention can be defined as a ferrite of a number of metal oxides such as Mn—Zn ferrite, or Ni—Zn ferrite.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The present invention will now be explained in detail.

Conventionally, the spray roasting method can be categorized into a technique (A) in which the material solution is sprayed into a combustion gas flame and a technique (B) in which the solution is sprayed from the upper portion of the reaction container and heated air having a temperature of 1200° C. is blown thereinto from the lower portion. In the technique (A), some reducing reaction inevitably occurs in the combustion flame due to the fuel, and therefore the oxidizing reaction for transforming metal chlorides into oxides proceeds slowly outside the flame. In the technique (B), the relative speed between the mist particles and the surrounding gas is small, and therefore the moisture evaporates so slowly that it takes a long time to raise the temperature to a degree required to conduct roasting.

In both techniques, it requires a long time to complete the oxidizing reaction, and before the completion of the reaction, metal chloride having high vapor pressures is sublimated into gases and separated.

The present invention is directed to a method of manufacturing, by use of the spray roasting technique, a composite ferrite formed of a number of types of metal oxides having different vapor pressures prepared from a solution containing those types of metal ions, for example chlorides thereof. According to the invention, the metal components are transformed simultaneously into oxides without dispersing the metal chloride having high vapor pressure, which is conventionally difficult to collect, and the reactions between the prepared oxides are enhanced, thereby forming a composite ferrite having a particular composition rate and crystal structure.

More specifically, in the present invention, a material solution is atomized, and heat energy is applied to the atomized solution so as to instantaneously vaporize the moisture of the particles of solution mist. The roasting reaction is enhanced due to the heat energy applied, and thus the dispersion of the high-vapor-pressure chloride can be suppressed to a minimum degree.

In the first embodiment of the invention, a high-temperature gas having heat energy sufficient to induce the roasting reaction and containing oxygen is injected into the descending or jet flow of a material solution so as to atomize the solution instantaneously and vaporize the moisture component at the same time, and thus the roasting reaction further proceeds.

The spray roasting method according to the present embodiment includes three factors, i.e. (1) evaporation of moisture by high-temperature gas and preparation of remaining particles, (2) atomization of solution by application of high-speed gas, and (3) roasting reaction of solid particles and manufacture of composite ferrite.

The following is a detailed explanation of each of the factors.

(1) Evaporation of Moisture by High-Temperature Gas and Preparation of Remaining Grains Evaporation of moisture by a high-temperature gas can be approximated by a known method from the assumption of a simplified model, i.e. evaporation of pure water. More specifically, regarding the pure water supplied in a unit time, (a) the heat energy required to raise the temperature of the pure water (room temperature) up to 100° C. (boiling point), (b) the heat energy required to evaporate the pure water at 100° C., and regarding gas phase $H_2O$, (c) the energy required to raise the temperature of the boiled pure water (100° C.) up to the gas phase temperature, are obtained. Assuming that the sum of the above three types of heat energy is equal to the heat energy discharged due to temperature decrease of high-temperature gas, i.e. the product of the difference in temperature, gas specific heat, and the amount of gas supplied in the unit hour, the temperature decrease of the high-temperature gas can be obtained. Usually, a large amount of gas is required for spraying; however with the present embodiment, it is possible to control the temperature decrease within 30° C. if solution supplied at 2 to 3 cc/min is vaporized at 1000° C. by high-temperature gas applied at 50 Nl/min.

Although the mist particles sprayed have small diameters, the relative speed between the gas and the mist particles is large, and therefore evaporation of moisture quickly proceeds. Meanwhile, grains remaining after vaporization are small, and therefore the gas temperature can be achieved in a short period of time.

2. Atomization of Solution By Application of High-Speed Gas

In connection with an atomization condition for atomizing liquid by a gas, the Weber number (wb) defined by the following equation (1) is known.

$$wb = \frac{D_L \mu^2 \rho}{\gamma} \quad (1)$$

where $D_L$: diameter of nozzle from which liquid discharged (cm)

$\mu$: speed of gas flow (cm/sec)

$\rho$: difference in density between gas and liquid (g/cm$^3$)

$\gamma$: surface tension between gas and liquid (dyne/cm)

It should be noted that when the wb value is $10^3$ to $10^4$, a satisfactory atomization state can be obtained. A satisfactory condition for atomization of a metal-ion-containing solution, for example, a metal chloride solution, by a high-temperature gas can be obtained from the equation (1). More specifically, first, the flow amount of the metal chloride solution is set, and the flow amount of the high-temperature gas is obtained from evaporation of the moisture by the high-temperature gas, so as to obtain the relationship between the flow amount of the metal chloride solution and that of the high-temperature gas. Then, the Weber number (wb) is set to a value with which a satisfactory atomization state such as above can be obtained, and the flow speed ($\mu$) of the high-temperature gas, and the diameter ($D_L$) of the nozzle from which the metal chloride solution is discharged are measured. Further, the cross section area of the opening of the gas nozzle from which the high-temperature gas is ejected is set. Since the surface tension of a concentrated solution of the metal chloride is unknown, the surface tension of pure water at 100° C. (58.84 dyne/cm) is used as a $\gamma$ value.

The calculations involved here can be performed easily by a well-known chemical engineering operation, and thus good condition for atomizing a metal chloride solution by a high-temperature gas can be obtained.

Conventionally, for atomization of a solution, generally known is an atomization technique in which the solution is pressurized and ejected from a nozzle having small ejecting hole (1-fluid atomization). However, the 1-fluid atomization method has a drawback such as the following. Solution ejected from the nozzle moves faster than the surrounding gas and therefore the mist particle speed is higher than the gas speed, and due to this large difference therebetween, the solution is atomized into a spray. However, during the atomization, jets of solution swirl taking in the surrounding gas, and thus the mist particles each quickly lose its kinetic energy, moving at the same speed as the gas flow.

When the jets take in the surrounding gas in such a steady state, the gas surrounding mist particles is saturated with vapor, and the particles move in the saturated gas atmosphere. Since all the heat required for vaporization is supplied from the gas, the temperature of the mist particles is lower than that of the gas. Consequently, in the case of the conventional spray roasting method in which 1 fluid spray is employed, the relationship, (mist particle speed)>(gas speed), is obtained. Here, a mist particle must proceed in the gas atmosphere saturated with vapor by preceding mist particles; therefore the temperature of the mist particles decreases lower than that of the gas. Since the temperature of mist particles remaining after vaporization of the moisture cannot be raised in a short period of time, it is difficult to collect oxides from metal chlorides having high vapor pressures.

In this embodiment, spray-roasting is carried out to achieve the relationship, (gas speed)>(mist particle speed). Under such condition, mist particles are constantly brought into contact with a gas having a high temperature and unsaturated with vapor; therefore the moisture of the mist particles can be instantaneously vaporized, and particles remaining after the vaporization can be heated up to the temperature of the gas in a short period of time. Consequently, oxides can be collected from metal chloride having high vapor pressure, as will be set forth later. In order to achieve the above-described conditions, it is preferable to employ an atomization method (2-fluid atomization) by a gas during the atomization of a solution. This 2-fluid atomization method can satisfy the above conditions at all times since the gas speed is faster than the mist speed in the method. Thus, a comparison between the 1-, and 2-fluid atomization methods indicates that though these methods involve the same relative speed of the mists particles, they greatly differ in evaporation of moisture and temperature increase of remaining particles.

Conventionally, the 1-fluid atomization method is more widely used than the 2-fluid method, since it is more practical, entailing the use of only a pressure pump and a fluid nozzle. However, it has been confirmed by the inventors of the present invention that the 2-fluid atomization method exhibits better advantages.

3. Roasting reaction of Solid Particles and Formation of Composite Oxides

There are two types of roasting reactions in which oxides and HCl are obtained from chlorides in the forms of metal salt particles, i.e. the reaction in which $O_2$ gas is necessary for the reaction, and that in which it is not necessary. The following are specific examples of Fe and Zn represented by the equations (2) and (3), respectively.

$$2FeCl_2+2H_2O+\tfrac{1}{2}O_2=Fe_2O_3+4HCl \tag{2}$$

$$ZnCl_2+H_2O=ZnO+2HCl \tag{3}$$

The reaction represented by the equation (2) is an exothermic reaction and is carried out usually at 500° to 800° C.

In contrast, the reaction represented by the equation (3) is an endothermic reaction, and the speed of the reaction itself is slow at a temperature of 500° to 800° C. Here, it should be noted that when the reactions represented by the equations (2) and (3) proceed slowly, $ZnCl_2$ (boiling point of 732° C.) having a higher vapor pressure than that of $FeCl_2$ is evaporated, separating Fe and Zn from each other.

Regarding this point, the spray roasting method according to the present invention maintains the condition of (gas speed)>(mist particle speed); therefore solid particles remaining after the evaporation of moisture can be heated to the gas temperature in a short period of time, which leads to the ferrite reaction represented by the following equation (4).

$$2FeCl_2+ZnCl_2+3H_2O+\tfrac{1}{2}O_2=ZnFe_2O_4+6HCl \tag{4}$$

The reaction represented by the equation (4) is obtained by combining the equations (2) and (3), and adding the ferrite preparation reaction represented by the equation (5) below thereto, and this synthesizing reaction is generally an exothermic reaction.

$$Fe_2O_3+ZnO=ZnFe_2O_4 \tag{5}$$

In the case where the particles remaining after evaporation of moisture is heated instantaneously to a high temperature, the reaction represented by the equation (4) proceeds without separating Zn and Fe from each other.

The following are the main factors having great influences on formation of a composite oxide.

(a) The temperature of the remaining particles must be raised to a reaction temperature for both reactions represented by the equations (4) and (5) in as short time as possible.

(b) The partial pressure of oxygen must be maintained at a certain level for the reaction of the equation (4) to occur.

Further, it is necessary to pay attention to the following items.

(c) Keeping the $H_2O$ partial pressure high.

(d) Keeping the HCl partial pressure low.

With regard to the above item (a), heating the particles in a sufficiently short time can be conducted by creating a good atomizing condition, which can be achieved by satisfying the above-mentioned atomization conditions. Although a type of composite oxide has its own reaction temperature, the reaction temperatures of composite oxides may fall in the range of 600° C. or higher (in expectation of the temperature decrease due to evaporation of moisture), preferably 800° C. or higher. In the case where the combustion gas is used, the industrially-possible upper limit of the reaction temperature is 1300° C., and therefore the reaction temperature is within the range of 600° to 1300° C., preferably 800° to 1100° C. In order to have a satisfactory reaction temperature, the high-temperature gas is preferably 800° C. or higher. The upper limit of the temperature of the high-temperature gas need not to define, but in general, is about 1400° C.

With regard to the item (b) for maintenance of the oxygen partial pressure, the oxygen partial pressures involved in the reactions represented by the equations (2) and (3) differ from each other; however, in both cases, the supplied gas is preferably an oxidizing gas. In the case where the combustion gas is used as a heating gas, the gas should contain of 1% or more of excessive oxygen. Further, when the oxygen partial pressure must be particularly high, heated air or oxygen can be used; however, usually, an appropriate oxygen partial pressure can be set in consideration of dilution due to steam evaporated. In order to have a satisfactory oxygen partial pressure, it is preferable that the oxygen content of the high-temperature gas is set to 1 to 21 vol. % (air).

With regard to items (c) and (d), generally, moisture which is evaporated serves to increase the $H_2O$ partial pressure, and decrease the HCl deviation, which can be calculated by a general chemical engineering method.

It should be noted that the metal-ion-containing solution which can be used as the material in the embodiment is not limited to one containing the above-mentioned metal chlorides, but one containing sulfates, nitrates, or organic acid salts. In general, as long as oxides are produced by heat decomposition at 800° to 1200° C., or by reacting with $H_2O$ as in the above equations (2) and (3), any water-soluble metal salts may be used. Solutions containing such salts are usually strongly acidic or neutral, but the material of the invention is not limited to such solutions. More specifically, a solution containing an oxyacid of an amphoteric metal such as Zn, alkaline metal salts, or alkali earth metal salts may be also used.

The first embodiment of the present invention will now be explained in more detail with reference to FIG. 1.

A storage vessel 1 stores a starting material, a mixed solution, and sends the solution to a liquid nozzle 2.

A heating gas 3 is a preheated high-temperature gas containing $O_2$ gas, and the gas 3 from a gas nozzle 4 is injected into a reaction container 6 while being heated by a heating furnace 5. While, the gas being injected, drops or spray of the solution supplied from the liquid nozzle 2 is atomized, and thus, the moisture is vaporized instantaneously, and the roasting reaction occurs.

The injecting speed of the high-temperature gas can be set by the weber number. In general, the gas speed should be at least 20 m/sec, and more preferably 50 to 100 m/sec or higher. The injected gas spreads downward at a solid angle of 70° while atomizing the solution dropped. According to the test result of the example, it is found that the length of an atomization section 7 necessary to complete the reaction of forming a composite oxide is about 20 to 50 cm, and the time required for passing this distance (length of the atomization section 7) is in the order of 1 msec, indicating the reaction takes place instantaneously.

The particles of the oxide formed in the atomization section 7 is introduced to a cooling section along with the gas. This cooling section usually functions as a heat exchanger 9, and prepares a preheated gas 11 from air 10 to absorb discharged heat.

The particles of the generated oxide is then introduced to a collecting section 12, where the particles are collected by a known particle-gas separation method using a cyclone, a bag filter or a electric dust collector. Here, in the case where the exhaust gas contains HCl as indicated by the equation (2) and (3), it is necessary to warm up the collecting section to a temperature higher than the dew point of HCl to prevent condensation of hydrochloric acid. The exhaust gas 13, from which the oxide particles which are produced were separated therefrom, is sent to an HCl collector 14, where HCl (or other gas produced) is collected, and then discharged to the atmosphere.

As described, the first embodiment provides a method of producing a composite ferrite, in which a solution is atomized by a high-temperature gas containing oxygen so as to evaporate the moisture instantaneously and allow the roasting reaction to occur.

The following is the second embodiment of the present invention.

This embodiment is based on the conventional method in which a solution is injected into a combustion gas flame. It should be pointed out that even the method in which a solution is injected into a combustion gas flame can produce a composite ferrite as in the first embodiment if the conditions are satisfied, i.e. the combustion gas contains 1% or more of oxygen, and evaporation of the moisture and the roasting reaction proceeds simultaneously.

In order to make the oxygen gas content of the combustion gas 1% or more, it is necessary to burn a fuel gas quickly with excessive air before evaporation and roasting reaction take place. Meanwhile, in order to render evaporation of the moisture of the solution and the roasting reaction occur instantaneously, it is necessary to transform the solution into fine particles by atomizing the solution by a spray nozzle, and inject the particles into the flame at high speed.

More specifically, vaporization of the solution particles and the roasting reaction always occur from the surface of each particle; therefore the larger the total surface area of the particles with respect to the amount of the solution, the faster the roasting reaction proceeds. Consequently, by increasing the number of particles per a certain amount of a solution in atomization of the solution, the reaction area can be remarkably increased. Thus, it is rendered possible to have the evaporation of the moisture and the roasting reaction occur instantaneously so as to form a composite ferrite.

The combustion gas used in this case must contain heat energy sufficient for the vaporization and roasting, and therefore it is preferable to use a burner with a combustion gas having a high combustion efficiency. An example of which is a toroidal burner.

The second embodiment of the invention will now be explained in more detail with reference to FIG. 2.

In this embodiment, a toroidal burner is used. In FIG. 2, reference numeral 21 denotes a burner tile having a cylindrical shape and serving as a main body. The burner tile 21 has an inner wall 26, on which a number of combustion-use air discharge holes 22 are arranged at a certain interval in the circumferential direction. The burner tile 21 also includes an inner edge wall 24, from the center of which a fuel gas nozzle 27 projects. On the circumferential wall of this fuel gas nozzle 27, formed are a number of combustion gas discharge holes 23 at a certain interval in the circumferential direction. Further, a solution spray nozzle 28 is provided in the nozzle 27 such that the tip of the spray nozzle 28 projects from the nozzle 27.

The combustion-use air discharge holes 22 and the fuel gas discharge holes 23 are formed such as to satisfy the following items (a) and (b).

(a) The combustion-use air discharge holes 22 are formed so that the direction of air ejection is not tilted at an angle of more than 60° with respect to the tangential line to the inner circumference of the burner tile.

(b) The fuel gas discharge holes 23 are formed so that the direction of fuel gas ejection is not at right angles with the tangential line to the outer circumference of the fuel gas nozzle 27, and the fuel gas flow swirls in the opposite direction to the air flowing from the combustion-use air discharge holes 23.

When these nozzles are formed such as to satisfy the above items (a) and (b), the fuel gas and the air swirl in the opposite directions, enabling sufficient mixture of the gas and air in a small combustion space. Thus, the combustion efficiency is improved. Further, by supplying excessive air, a combustion gas having an oxygen content of 1% or higher can be easily prepared, and the combustion taking place in a narrow space creates a state in which the flow speeds of the gas and air are high. More specifically, a high speed gas flow of 23 m/sec or higher can be achieved at 800° C., enabling quick roasting of an atomized solution.

Figure 1:
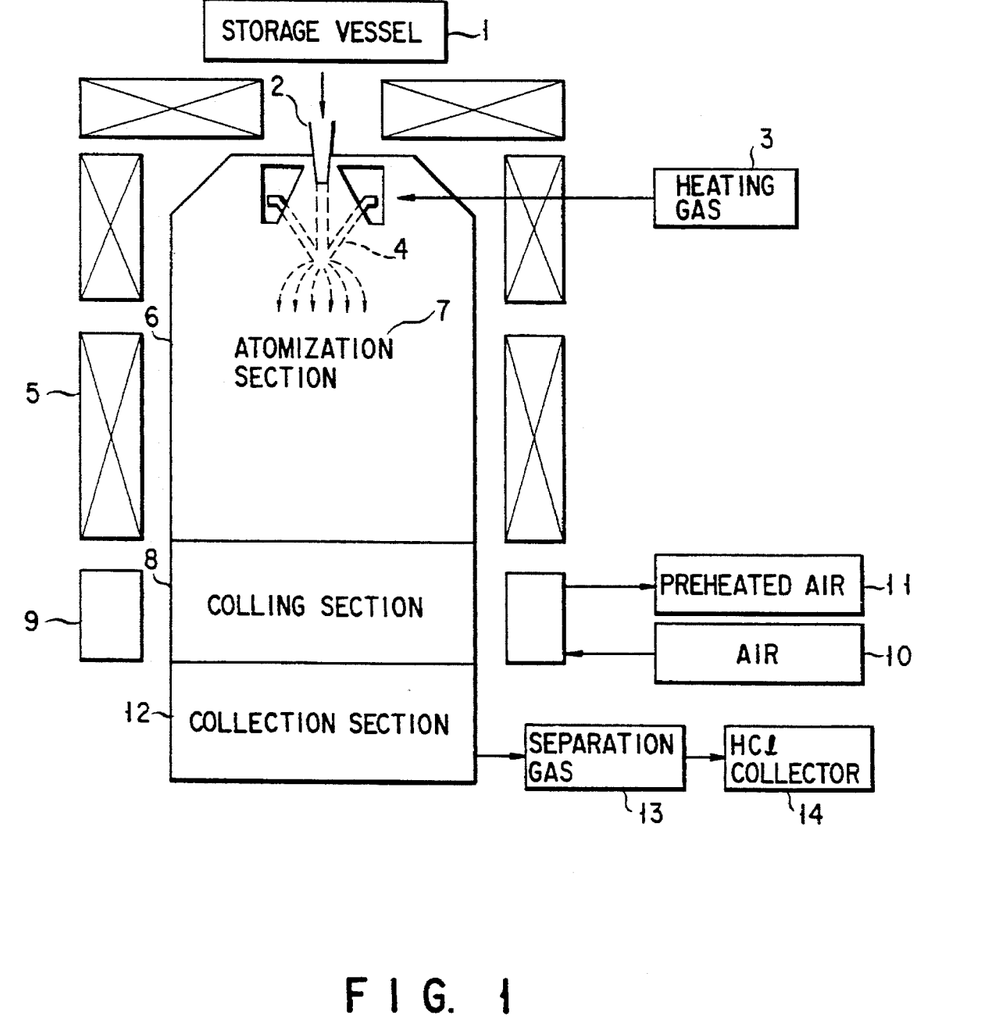
FIG. 1 is a schematic drawing showing an apparatus used to conduct the first embodiment of the present invention.

In the case where the invention is practiced using a burner having the above-described structure, such a burner is placed in a container similar to the reaction container 6 shown in FIG. 1, and fuel gas is burnt by the air, producing a combustion gas containing oxygen in the combustion space 25. Then, solution is sprayed from the solution spray nozzle 28 so as to supply fine particles of the solution into the combustion gas. The high-speed combustion gas serves to make the evaporation of the moisture of the solution and the roasting reaction instantaneously occur.

As described, according to the second embodiment, a composite ferrite can be manufactured by supplying atomized solution into combustion gas containing oxygen.

The third embodiment will now be described. In the above two embodiments, the moisture of atomized solution was instantaneously vaporized basically by increasing the flow rate of the high temperature gas, whereas in this embodiment, the moisture of atomized solution was instantaneously vaporized by defining the diameter of mist particles of atomized solution.

More specifically, in the second embodiment, a toroidal burner with having a high speed gas flow and a significant combustion gas agitation effect, was used to instantaneously vaporize the moisture of atomized solution, whereas in this embodiment, the diameter of mist particles is specified to be 150 μm or smaller, and therefore even an ordinary burner, which has a combustion gas agitation effect smaller than that of a toroidal burner, can be used for instantaneous vaporization of moisture.

The gasification and roasting reaction occurs on the surface of each solution units, thus the larger the surface area of a mist, the quicker the gasification and roasting reaction proceed. It is necessary that gasification be completed before a roasting reaction occurs; however it is generally said that a gasification rate determines the entire reaction rate when a quick reaction involves a gasification reaction. The relationship between a diameter of liquid (mist) particle and a gasification rate will be as follows:

Let us suppose that a liquid particle is spherical. Then, the Ranz-Marshall's equation represented by the following formula (6) can be applied as a formula for expressing transfer of heat.

$$hd/k = 2.0 + 0.60 Re^{1/2} Pr^{1/3} \quad (6)$$

where h: heat transfer coefficient, d: diameter of liquid particle, k: heat conductivity, Re: Reynolds number, Pr: Prandtl number.

The actual diameter of liquid particle is as small as an order of 100 μm, and therefore, of the items on the right hand side of the equation (6), $0.60\ Re^{1/2}Pr^{1/3}$ is substantially 0. Consequently, the equation (6) will be rewritten as:

$$hd/k = 2$$

When the radius of a liquid particle is represented by r, the equation 6 can be rewritten into as follows:

$$h = k/r \quad (7)$$

Since evaporation of liquid particle proceeds from their surfaces, the radius of each particle is gradually decreased. Therefore, the following relationship represented by the equation (8) can be established between a decreasing rate of the volume of a particle, and a heat transfer rate.

$$\frac{d}{dt}\left(\frac{4}{3}\pi r^3 \cdot Hw\right) = -4\pi r^2 h(Tg - Tw) \quad (8)$$

Where,
Hw: heat required for gasifying liquid particle
Tg: gas temperature
Tw: liquid particle temperature.

The equation (8) is developed, and substituted in the equation (7), the time $t_0$ required to completely gasify a liquid particle can be expressed in the following equation (9).

$$t_0 = \frac{r_o^2 Hw}{2k(Tg - tw)} \quad (9)$$

As expressed in this equation, the gasification time for a liquid particle (mist particle) is prolonged in proportional to the square of the radius $r_0$ of a liquid particle (mist particle), and the higher, the gas temperature, the shorter, the gasification time.

Figure 3:
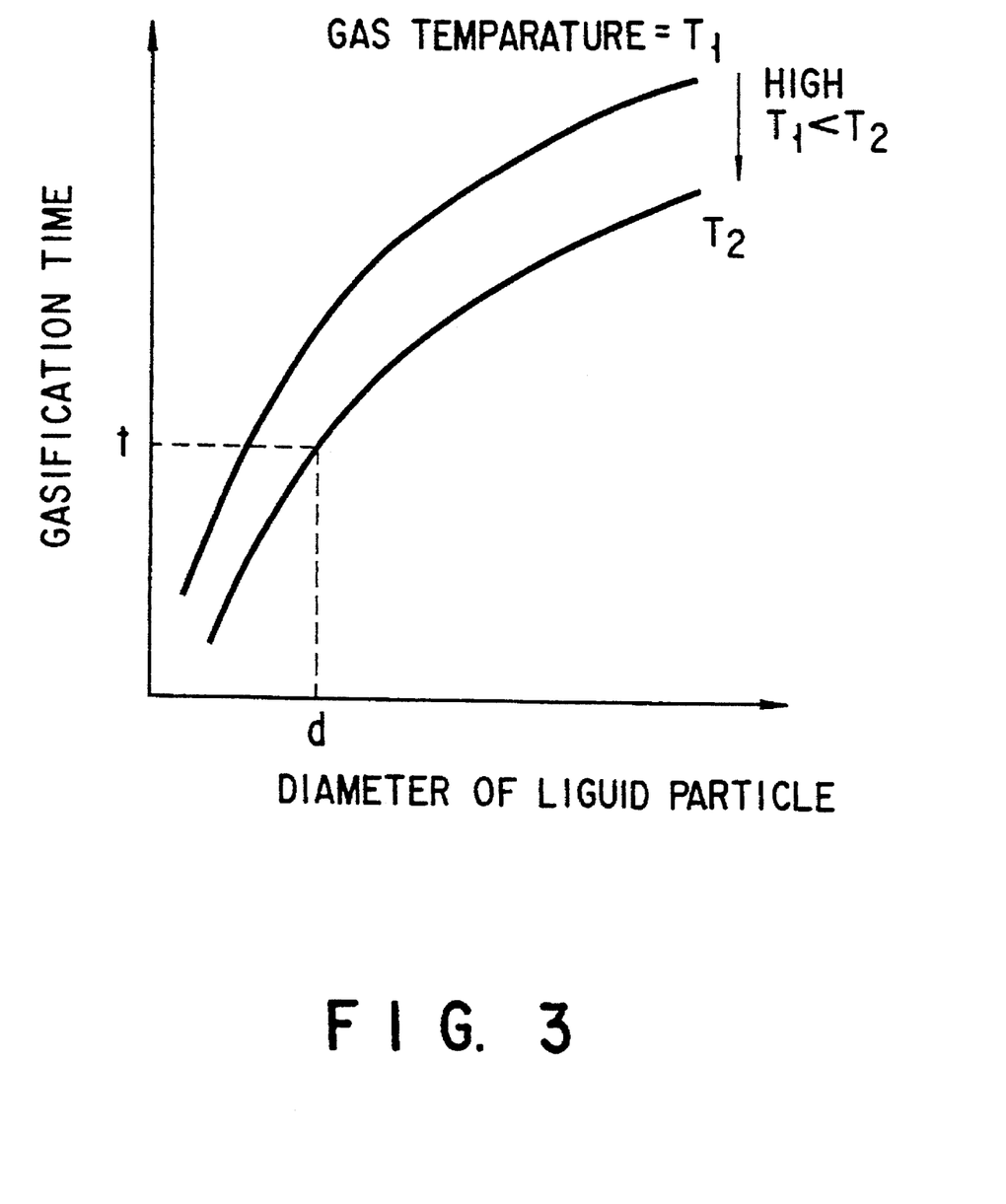
FIG. 3 is a graph showing the correlation between a diameter of mist particle, a gas temperature, and a gasification time.

FIG. 3 is a graph, based on the equation (9), showing the relationship between the diameter of a liquid particle, and a gasification time for different gas temperatures.

As is clear from FIG. 3, the gasification time is greatly dependent on the liquid particle diameter, and therefore it is considered that there should be a certain limitation for the diameter of a liquid particle for carrying out a desired quick roasting in the case where a temperature is set in the roasting furnace.

In view of the above observation, conducted is an experiment, in which a combustion gas (usually 600° to 1800° C.) is generated by an ordinary burner, and a chloride solution is sprayed into the gas with different particle diameters so as to manufacture a composite ferrite in each case. From the experiment, it was found that in the case where the particle diameter of mist is 150 μm or less, the moisture of a liquid particle can be instantaneously evaporated, achieving a roasting quick enough to obtain a composite ferrite having substantially the same composition ratio as that of the original solution. In short, when the particle diameter of mist is limited to 150 μm or less, a composite ferrite having substantially the same composition ratio as that of the original solution can be obtained by spray roasting using an ordinary burner. It should be noted that the diameter of the mist particle is preferably 100 μm or less.

Figure 4:
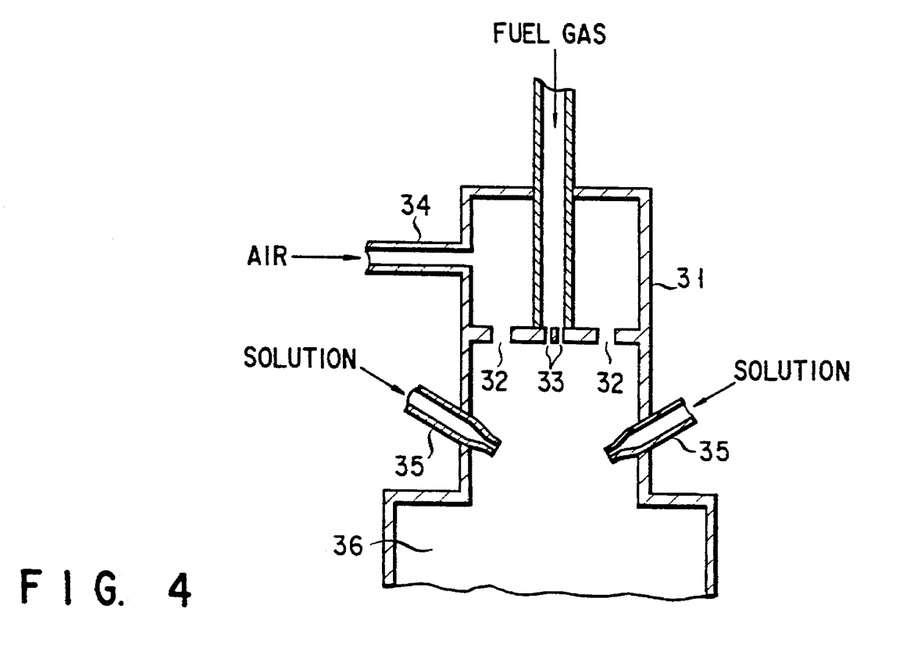
FIG. 4 is a sectional view showing an example of the burner used in the third embodiment of the present invention.

In this embodiment, an ordinary burner as shown in FIG. 4 is used. In the figure, reference numeral 31 denotes the main body of the burner, in which air discharge holes 32 are provided. The combustion gas is ejected out of combustion gas discharge holes 33. Into the main body 31 of the burner, air is supplied from the air supply pipe 34, and the combustion gas is burned. Further, there are a plurality (two in FIG. 4) of spray nozzles 35 provided on the main body 31 of the burner for spraying the chloride solution toward the downstream of the combustion gas discharge holes 33. Here, by setting the diameter of mist particles of the solution to 150 μm or less, the moisture of each mist particle can be instantaneously evaporated in the space 36 of the main body 31 of the burner, thereby achieving a desired quick roasting operation. It should be noted that a burner having one spray nozzle 35 may be used.

To collect the composite ferrite produced, and absorb the discharged heat, the part of the structure used in the first embodiments shown in FIG. 1 can be used in the second and third embodiment.

The method of manufacturing a composite ferrite according to the present invention entails remarkable industrial advantages as follows as compared to the conventional dry method, or wet method.

In connection with the reaction apparatus:

(1) Since the reaction takes place instantaneously, the size of the apparatus can be small, yet exhibiting a large productivity, and the apparatus can stand a continuous long-term operation. The process involved in the invention is a one-step process using only a spray roasting apparatus and some accessories, and the valuable components in the discharge gas, and discharged acids can be also collected.

(2) When atomizing using the heating gas, the heating gas can be freely and accurately controlled in terms of composition, especially, the oxygen partial pressure. Therefore, the invention is able to handle many types of salts in the material solution, and a wide variation of the composition, etc.

(3) Even in the case where atomized solution is supplied to a combustion gas prepared by, for example, a toroidal burner for roasting, the oxygen partial pressure can be accurately controlled by supplying an excessive amount of air. Thus, the applicability of the invention is high.

(4) Even in the case where roasting is carried out by supplying atomized solution to a combustion gas generated by an ordinary burner, an oxide having substantially the same composition ratio as that of the material solution can be prepared by controlling the diameter of mist particles of the solution.

In connection with the composite oxide particles produced:

(5) The vaporization and roasting are carried out while the uniform mists of the solution are floating in the gas, and all the reaction is instantaneously completed before separation of the metals having different vapor pressures occurs. Therefore, oxide particles produced are extremely uniform.

(6) The oxide particles are extremely fine since they are produced from a spray mist, and the deviation of the particle sizes is small. The size of the particles produced can be adjusted by changing the metal concentration of the material solution and the atomization conditions. In general, the size of particles produced is reduced by lowering the metal concentration or increasing the flow amount of heating gas (intensifying the atomization).

(7) Since the oxide particles produced are fine, the grinding step, a necessary step in the dry method, and in which impurities are inevitably mixed into the particles, can be omitted. Thus, the product quality can be maintained high.

EXAMPLES

Examples of the present invention will now be described. Examples 1 to 5 correspond to the first embodiment, Example 6 corresponds to the second embodiment, and Examples 7 and 8 correspond to the third embodiment.

Example 1

As a material solution, 1 l of chloride solution (pH 1.1) containing 74.3 g/l of Fe (II) and 23.3 g/l of Mn (II) was used. A atomization roasting apparatus having the structure shown in FIG. 1 was employed, and 50 l/min of air (standard state) was preheated to 1000° C. to be used as a heating gas. The gas nozzle employed was a quartz-made lance type, and consisted of 4 lances each having an opening diameter of 1 mm, which were designed such that the jets emitted are brought into focus at a position 2.5 cm lower than the lances.

The reaction container was a quartz tube having an inner diameter of 10 cm and a height of 100 cm, and the temperature of the upper 20 cm-portion (atomization) and that of the lower portion were kept at 1000° C. and 1100° C., respectively.

Further, there was provided an air cooled tube having a height of 30 cm at the lower portion of the quartz tube, and a particle collecting vessel and a cloth filter, the temperatures of which were kept at 150° C. to 120° C., were set underneath the air cooled pipe.

The exhaust gas was washed in a washing column using an NaOH solution, and HCl produced was quantified.

Toward the focal point of the ejected gas, the solution was allowed to flow down at 2 to 3 ml/min so as to be atomized, and 129.5 g of particles produced was caught by the particle collecting vessel and the cloth filter. The analysis of the produced particles exhibited that the Fe and Mn contents were 50.6 wt % and 14.3 wt %, respectively, the ratio between which substantially equals to the Fe:Mn ratio in the material solution, 78:22. The produced particles were subjected to an X-ray analysis, and were confirmed to be $MnFe_2O_4$. Further, in a magnetism test, all the particles were attracted to a magnet. Regarding the particle size, the average particle diameter of the product was 0.4 µm. Further, the HCl yield was 100%, which was known by the amount of NaOH used in the washing column.

Example 2

1 l of chloride solution (pH 1.1) containing 99.0 g/l of Fe (II), 32.0 g/l of Mn (II), and 16.2 g/l of Zn (II) was used, and the example was carried out in the same manner as in Example 1. The analysis of the produced particles exhibited that the Fe, Mn, and Zn contents were 46.5 wt %, 14.0 wt %, and 7.4 wt %, respectively. Compared to the Fe:Mn:Zn ratio in the material solution, i.e., 66.1:22.8:11.0, it is understood that the Zn content of the product was slightly low. The produced particles were subjected to an X-ray analysis, and were confirmed to be $(Zn, Mn) Fe_2O_4$. Further, in a magnetism test, all the particles were magnetized.

The diameters of the product particles fell in the range of 0.4 to 0.5 µm.

Example 3

$N_2$ and $O_2$ were mixed with each other at different ratios to examine the relationship between a gas composition and product composition, and this examination was carried out for two different oxygen partial pressures of the heat gas, i.e. 2% and 7%. Other than that mentioned above, the example was carried out in the same manner as Example 2. The yield of the composite oxides collected, and the results the analysis were shown in Table 1 along with those of Example 2.

TABLE 1

| | Oxygen partial pressure % | | |
| --- | --- | --- | --- |
| | 2 | 7 | 21 |
| Yield of oxides % | 74.8 | 95.0 | 93.1 |
| Analyzed oxide contents % | | | |
| Fe | 45.6 | 43.9 | 46.5 |
| Mn | 14.5 | 14.3 | 14.0 |
| Zn | 7.2 | 7.6 | 7.4 |

As shown in the table, the yields of all the oxides were somewhat low. This is because the particles produced were so fine that they passed the filter without being caught.

Further, the composition of the product obtained when the oxygen partial pressure was 2% was Fe of 45.6 wt %, Mn of 14.5 wt %, and Zn of 7.2 wt %, and that obtained when the oxygen partial pressure was 7% was Fe of 43.9 wt %, Mn of 14.3 wt % and Zn of 7.6 wt %. These products were subjected to an X-ray analysis, and it was confirmed that (Zn, Mn) $Fe_2O_4$ was obtained even when the oxygen partial pressure was 2%, and that all the products exhibited a magnetic property.

Example 4

The temperature of the atomizing section was varied as 600°, 800°, 1000°, and 1200° C. by adjusting the temperature of the heating gas so as to examine the relationship between the temperature of the atomizing section and the products. Other than that mentioned above, the example was carried out in the same manner as Example 2. The yields, the compositions, the results of the X-ray analysis, and magnetic properties of the products obtained by those temperatures were shown in Table 2 along with those of Example 2.

TABLE 2

|  | Temperature °C. | | | |
| --- | --- | --- | --- | --- |
|  | 600 | 800 | 1000 | 1200 |
| Yield of oxides % | 72.1 | 75.2 | 93.1 | 96.0 |
| Analyzed oxide contents % | | | | |
| Fe | 50.9 | 50.9 | 46.5 | 48.0 |
| Mn | 16.6 | 16.8 | 14.0 | 14.9 |
| Zn | 1.3 | 8.1 | 7.4 | 7.7 |
| X-ray diffraction | $Fe_2O_3$ $Mn_2O_3$ | (Zn,Mn) $Fe_2O_4$ | (Zn,Mn) $Fe_2O_4$ | (Zn,Mn) $Fe_2O_4$ |
| Magnetism | partially unmagnetized | totally magnetized | totally magnetized | totally magnetized |

The results shown in Table 2 indicate that the temperature of the atomizing section should be 800° C. or more, preferably 1000° C. to 1200° C.

Example 5

During the same attempt as Example 1 was being carried out, a part of the heat generator of the furnace accidentally went off. As a result, the temperature of the upper 20 cm-portion (atomizing section) of the reaction quartz tube was 1000° C. as normal, but the temperature of the top end of the lower portion decreased to 750° C., and the bottom end thereof to 650° to 700° C. The attempt was carried on until the end in the above-described state, but the results obtained from this attempt were substantially the same as those of Example 1.

The results indicate that the most of the oxide producing reaction is already completed by the time the mist particles pass the next 20 to 40 cm section after the atomizing section.

Example 6

Figure 2:
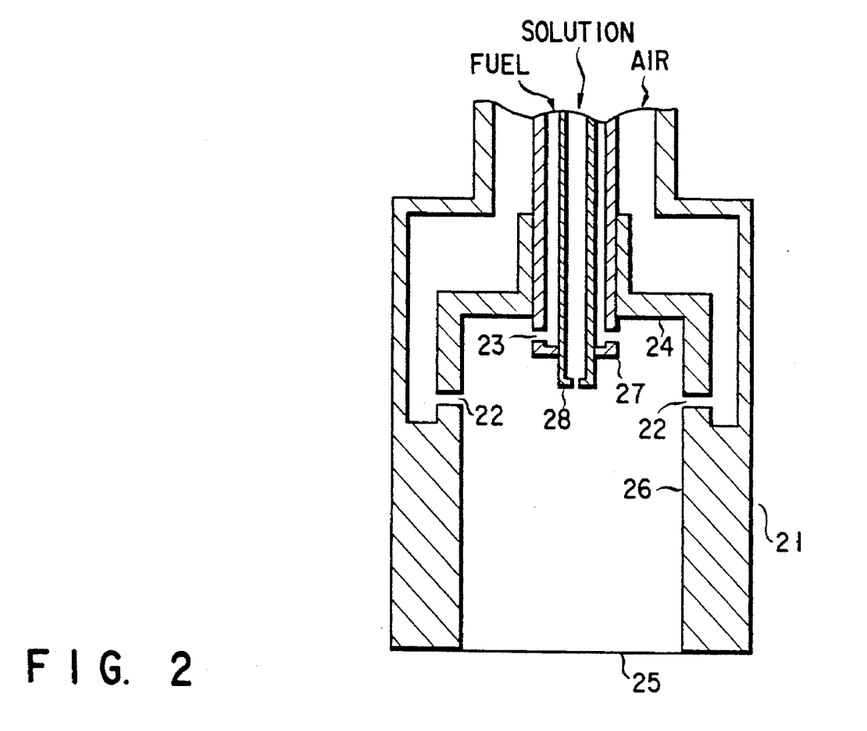
FIG. 2 is a sectional view showing a burner used to conduct the second embodiment of the present invention.

1 l of chloride solution containing 99.0 g/l of Fe (II), 32.0 g/l of Mn (II), and 16.2 g/l of Zn (II) as a material, and a coke oven gas as a combustion gas, were used to manufacture a composite ferrite by use of a troidal burner shown in FIG. 2. In this example, the roasting temperature, and the amount of solution sprayed, were set to 908° to 1109° C., and 167 to 190 cc/min, respectively. The production conditions set for the example, and the characteristics of the composite oxide obtained were as shown in Table 3.

TABLE 3

|  | No. 1 | No. 2 | No. 3 |
| --- | --- | --- | --- |
| Flow rate of coke oven gas ($Nm^3$/H) | 27.0 | 28.1 | 32.4 |
| Flow rate of pressured air ($Nm^3$/H) | 242.4 | 223.7 | 248.6 |
| Fuel gas/air | 8.97 | 7.96 | 7.67 |
| Roasting temperature (°C.) | 1109 | 908 | 971 |
| Spray rate (cc/min) | 167 | 206 | 190 |
| Time (min) | 40 | 92 | 105 |
| Collected amount (g) | 1062 | 2892 | 3243 |
| Yield (%) | 95.8 | 92.0 | 98.0 |
| Form of roasted material | (Zn,Mn) $Fe_2O_4$ | (Zn,Mn) $Fe_2O_4$ | (Zn,Mn) $Fe_2O_4$ |
| Grain size (μm) | 5.9 | 5.5 | 3.3 |
| Analyzed oxide contents (%) | | | |
| Fe | 69.4 | 70.3 | 68.3 |
| Mn | 20.5 | 19.8 | 21.8 |
| Zn | 10.1 | 9.9 | 9.9 |
| Properties of solution | Chloride concentration: 13% Fe:Mn:Zn = 67.5:21.7:10.8 | | |

As is clear from Table 3, according to this example, the yield of Zn was high despite that a chloride of Zn has a vapor pressure so high that it is difficult to collect in the form of an oxide. Further, as indicated in the table, the products obtained from roasting each had the structure of the composite ferrite, (Zn, Mn) $Fe_2O_4$.

Example 7

A chloride solution containing 99.3 g/l of Fe (II), 32.0 g/l of Mn (II), and 15.9 g/l of Zn (II) as a material, and a coke oven gas (to be called as C gas hereinafter) as a fuel gas, were used to manufacture a composite ferrite. The gas was burned by a use of an ordinary burner, and into the high-temperature gas, the above chloride solution was sprayed under the following conditions, i.e. the amount of C gas supplied per hour: 27 $Nm^3$/h, the amount of air applied per hour: 243 $Nm^3$/h, the amount of solution sprayed: 200 cc/min, and the diameter of mist particle: 150 μm or less. The roasting temperature was set to 980° C.

In this example, no attachment was found in the furnace. Further, the component ratio of the solution and that of the oxide collected were as shown in the following Table 4.

TABLE 4

| Content | Composition Ratio of Solution % | Composition Ratio of Oxide Collected % |
| --- | --- | --- |
| Fe | 67.5 | 66.6 |
| Mn | 21.7 | 22.0 |
| Zn | 10.8 | 11.4 |

As shown in Table 4, it was confirmed that the composition ratio of the collected oxide substantially coincided with that of the solution by setting the diameter of mist particles to 150 μm or less. The result of the example indicated that a quick roasting could be achieved by controlling the diameter of mist particles. It should be noted that the collected oxide has a ferrite structure of (Zn, Mn) $Fe_2O_4$.

For comparison, another spray roasting experiment was carried out under the same conditions as above except that the atomized solution contains about 15% of mist particles having a diameter of 150 to 270 μm.

According to the results of the experiment, about 14% of the oxide product remained in the furnace as deposits, which coincided with the ratio of atomized particles having a diameter of 150 to 270 μm. Further, the component ratio of the solution and that of the oxide collected were as shown in the following Table 5.

TABLE 5

| Content | Composition Ratio Solution % | Composition Ratio of Oxide Collected % | Composition Ratio of Attachment % in the furnace |
| --- | --- | --- | --- |
| Fe | 67.5 | 64.1 | 74.2 |
| Mn | 21.7 | 20.3 | 19.6 |
| Zn | 10.8 | 15.6 | 7.2 |

As shown in Table 5, it was confirmed that the Zn concentration of the attachment remaining in the furnace was clearly lower than that of the solution, and the Zn concentration was high in the collected oxide. The reason for this is considered that those particles having large diameters were roasted not quickly enough, remaining in the furnace as deposits, and then gradually roasted. While the deposits were being gradually roasted, $ZnCl_2$, which has a high vapor pressure, in the deposits was evaporated before the roasting, and collected along with the collected oxide, thereby raising the Zn concentration to a high level in the collected oxide, and lowering it in the deposits. It should be noted that, despite the significant composition variation, the collected oxide had a ferrite structure of $(Zn, Mn) Fe_2O_4$.

Example 8

A spray roasting experiment was carried out under the same conditions as those of Example 7 except that the diameter of mist particles was limited to 100 μm or less. The component ratio of the solution and that of the oxide collected were as shown in the following Table 6.

TABLE 6

| Content | Composition Ratio of Solution % | Composition Ratio of Oxide Collected % |
| --- | --- | --- |
| Fe | 67.5 | 67.3 |
| Mn | 21.7 | 21.8 |
| Zn | 10.8 | 10.9 |

As shown in Table 6, it was confirmed that the composition ratio of the collected oxide was even closer to that of the solution, indicating a more significant effect of the quick roasting.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a composite ferrite comprising oxides of two or more metals, one of said metals being zinc, prepared from a chloride solution containing ions of said metals, the method comprising the steps of:
   (a) allowing the solution to flow down in a reaction vessel or injecting the solution into the reaction vessel; and
   (b) injecting a high-temperature gas containing oxygen into said solution, said high-temperature gas being at a speed which is faster than a speed of flowing down drops of the solution or an injecting speed of the solution, said high-temperature gas containing 1 to 21 volume % of oxygen gas, and being at a temperature of 800° C. or higher, to atomize said solution into mist particles, and to evaporate moisture from each mist particle of said solution in such a short period of time that zinc chloride in the solution is not substantially evaporated, and to induce heat decomposition or chemical reaction of remaining metal salt particles, thereby forming composite ferrite particles, the composite ferrite having substantially the same composition ratio as that of said chloride solution.

2. The method according to claim 1, wherein said high-temperature gas, has a temperature of 800° to 1400° C.

3. The method according to claim 2, wherein the gas is injected at a speed of 50 to 100 m/sec.

4. The method according to claim 1, wherein the ferrite is a Mn—Zn ferrite or a Ni—Zn ferrite.

5. The method according to claim 1, wherein said atomizing is carried out such that a Weber number of $10^3$ to $10^4$ is obtained; and the atomizing is carried out at a temperature of 1000° C. to 1200° C.

6. The method according to claim 1, wherein the gas is injected at a speed of at least 20 m/sec.

7. The method according to claim 1, wherein the period of time is about 1 msec.

8. A method of manufacturing a composite ferrite comprising oxides of two more metals, one of said metals being zinc, prepared from a chloride solution containing ions of said metals, the method comprising the steps of:
   (a) atomizing the solution which flows down in a reaction vessel or is injected into a reaction vessel, into mist particles by injecting the solution into a combustion chamber; and
   (b) supplying the atomized solution into a combustion gas, said combustion gas being at a speed which is faster than a speed of flowing down drops of the solution or an injecting speed of the solution, said combustion gas containing 1 to 21 volume % of oxygen gas and being at a temperature of 800° C. or higher, said combustion gas containing oxygen so as to evaporate moisture from each mist particle of said atomized solution in such a short period of time that zinc chloride in the solution is not substantially evaporated, and to induce heat decomposition or chemical reaction of remaining metal salt particles, thereby forming composite ferrite particles, the composite ferrite having substantially the same composition ratio as that of said chloride solution.

9. The method of manufacturing a composite ferrite according to claim 8, wherein said combustion gas is generated from a burner.

10. The method according to claim 9, wherein the speed of said combustion gas is faster than the speed of the mist particle of the solution.

11. The method according to claim 9, wherein said burner is a torodial burner.

12. The method according to claim 8, wherein the ferrite is a Mn—Zn ferrite or a Ni—Zn ferrite.

13. A method of manufacturing a composite ferrite comprising oxides of two or more metals, one of said metals being zinc, prepared from a chloride solution containing ions of said metals, the method comprising the steps of:

(a) atomizing the solution which flows down in a reaction vessel or is injected into a reaction vessel, into mist particles having a diameter of 150 μm or less by injecting the solution into a combustion chamber; and (b) supplying the atomized solution into a combustion gas, said combustion gas being at a speed which is faster than a speed of flowing down drops of the solution or an injection speed of the solution, said combustion gas containing 1 to 21 volume % of oxygen gas and being at a temperature of 800° C. or higher, said combustion gas containing oxygen so as to evaporate moisture from each mist particle of said atomized solution and to induce heat decomposition or chemical reaction of remaining metal salt particles, thereby forming composite ferrite particles, wherein zinc chloride in the solution is not substantially evaporated, the composite ferrite having substantially the same composition ratio as that of said chloride solution.

14. The method according to claim 13, wherein the ferrite is a Mn—Zn ferrite or a Ni—Zn ferrite.

* * * * *